United States Patent
Fang et al.

(10) Patent No.: US 12,339,192 B2
(45) Date of Patent: Jun. 24, 2025

(54) PRESSURE SENSOR CERAMIC MATERIAL AND PREPARATION METHOD THEREOF

(71) Applicant: Hunan Meicheng Ceramic Technology Co., Ltd, Loudi (CN)

(72) Inventors: Haojie Fang, Loudi (CN); Yiwen He, Loudi (CN); Xiaoyun Zhang, Loudi (CN); Guanjun Qiao, Loudi (CN); Xianfeng Yang, Loudi (CN); Meiling Fang, Loudi (CN)

(73) Assignee: Hunan Meicheng Ceramic Technology Co., Ltd, Loudi (CN)

( * ) Notice: Subject to any disclaimer, the term of this patent is extended or adjusted under 35 U.S.C. 154(b) by 960 days.

(21) Appl. No.: 17/400,162

(22) Filed: Aug. 12, 2021

(65) Prior Publication Data

US 2022/0221359 A1 Jul. 14, 2022

(30) Foreign Application Priority Data

Jan. 11, 2021 (CN) .......................... 202110028583.9

(51) Int. Cl.
| | | |
|---|---|---|
| G01L 9/12 | (2006.01) | |
| C04B 35/462 | (2006.01) | |
| C04B 35/49 | (2006.01) | |
| C04B 35/626 | (2006.01) | |
| G01L 1/14 | (2006.01) | |

(52) U.S. Cl.
CPC .............. *G01L 9/12* (2013.01); *C04B 35/462* (2013.01); *C04B 35/626* (2013.01); *G01L 1/14* (2013.01); *C04B 35/49* (2013.01); *C04B 2235/3208* (2013.01); *C04B 2235/3224* (2013.01); *C04B 2235/3232* (2013.01); *C04B 2235/3275* (2013.01); *C04B 2235/3279* (2013.01); *C04B 2235/3281* (2013.01)

(58) Field of Classification Search
CPC ........... G01L 9/12; G01L 1/14; C04B 35/462; C04B 35/626; C04B 35/62655; C04B 35/49; C04B 35/62675; C04B 2235/3208; C04B 2235/3224; C04B 2235/3232; C04B 2235/3275; C04B 2235/3279; C04B 2235/3281; C04B 2235/441; C04B 2235/444; C04B 2235/448; C04B 2235/449; C01P 2006/14; C01P 2006/32; C01G 23/002

See application file for complete search history.

(56) References Cited

U.S. PATENT DOCUMENTS

| | | | |
|---|---|---|---|
| 10,714,292 B2 * | 7/2020 | Luhmann, Jr. .... | C04B 35/62655 |
| 2007/0275230 A1 * | 11/2007 | Murphy ............ | C23C 28/00 |
| | | | 428/323 |

FOREIGN PATENT DOCUMENTS

| | | | | |
|---|---|---|---|---|
| CN | 103553589 A | * | 2/2014 | |
| CN | 104344927 A | | 2/2015 | |
| CN | 206178729 U | | 5/2017 | |
| CN | 107176604 A | * | 9/2017 | ............ D06M 11/74 |
| CN | 212158891 U | | 12/2020 | |
| KR | 20210108985 A | * | 9/2021 | ........... C07D 487/04 |

OTHER PUBLICATIONS

Mu et al., "Enhanced Piezocapacitive Effect in CaCu3Ti4O12-Polydimethylsiloxane Composited Sponge for Ultrasensitive Flexible Capacitive Sensor," ACS Applied Nano Mater. 2018 (1), 274-83. (Year: 2018).*
Rhouma et al., "Comparative studies of pure, Sr-doped, Ni-doped and co-doped CaCu3Ti4O12 ceramics: Enhancement of dielectric properties," J. Alloys and Compounds 717 (2017), 121-26. (Year: 2017).*
Chung et al., "Initial cation stoichiometry and current-voltage behavior in Sc-doped calcium copper titanate," Applied Physics Letters 89 (2006), 191907. (Year: 2006).*
Sun et al., "Microstructure, dielectric properties and impedance spectroscopy of Ni doped CaCu3Ti4O12 ceramics," RSC Adv., 2016 (6), 55984-89. (Year: 2016).*
He et al., "Electrical and magnetic properties of NiCuZn—CaCu3Ti4O12 composites doped with Bi2O3," J. Alloys and Compounds 504 (2010), 435-39. (Year: 2010).*
Gaskins et al., "Review—Investigation and Review of the Thermal, Mechanical, Electrical, Optical, and Structural Properties of Atomic Layer Deposited High-k Dielectrics: Beryllium Oxide, Aluminum Oxide, Hafnium Oxide, and Aluminum Nitride," ECS J. Solid State Sci. Technol. 6 (2017), N189. (Year: 2017).*
Machine Translation of CN-107176604-A (Year: 2017).*
Machine Translation of CN-103553589-A (Year: 2014).*
Machine Translation of KR-20210108985-A (Year: 2021).*
Thomas, P., et al., "Structural, thermal and electrical properties of poly(methyl methacrylate)/CaCu3Ti4O12 composite sheets fabricated via melt mixing," J. Therm. Anal. Calorimetry 115 (2014), pp. 1311-1319. (Year: 2014).*

\* cited by examiner

*Primary Examiner* — Bryan D. Ripa
*Assistant Examiner* — Paul Alan Forsyth
(74) *Attorney, Agent, or Firm* — Nitin Kaushik

(57) ABSTRACT

A pressure sensor ceramic material and a preparation method thereof, comprising: nano ceramic particles with a molecular formula $CaCu_{3-x}M_xTi_{4-y}Sc_yO_{12}$, wherein: $0<x\leq 1$, $0.2\leq y\leq 0.8$, glass-phase nano-oxide particles with a molecular formula $A_2O_3$, AlN, BeO, poly (methyl methacrylate) (PMMA), polycrystalline diamond powder, microfiltration membrane polymer, and dimethylformamide. The diamond powder coated with 10 μm to 20 μm of the sub-micron layer doped AlN and BeO prepared by the present disclosure can reduce the defect of uniform and isotropic crystal structure caused by gradient modification of $CaCu_{3-x}M_xTi_{4-y}Sc_yO_{12}$ by $A_2O_3$ glass-phase nano-oxide, reduces the stress concentration of the resulting pressure sensor ceramic material against impact and avoids the defect that the cross-section bonding degree decreases due to the grain boundary movement.

8 Claims, No Drawings

PRESSURE SENSOR CERAMIC MATERIAL AND PREPARATION METHOD THEREOF

CROSS-REFERENCE TO RELATED APPLICATIONS

The application claims priority to Chinese patent application No. 202110028583.9, filed on Jan. 11, 2021, the entire contents of which are incorporated herein by reference.

TECHNICAL FIELD

The present disclosure belongs to the technical field of sensor ceramics, in particular to a pressure sensor ceramic material and a preparation method thereof.

BACKGROUND

Material is the substance foundation of human production and life, and is the symbol of human progress and human civilization. With the emergence and development of new technologies such as space technology, photoelectric technology, infrared technology, sensing technology and energy technology, materials must have superior performance such as high temperature resistance, corrosion resistance and wear resistance to be used in a relatively harsh environment. It is difficult for traditional materials to meet the requirements. Developing and effectively utilizing high-performance materials has become an inevitable trend in the development of material science. However, the ceramic material in the prior art has a low coefficient of thermal expansion, resulting in a low heat dissipation capacity, which is liable to cause a fire safety implication, and does not meet the requirements of the chip-type and miniaturized sensor electronic sensor ceramic material in the existing market.

SUMMARY

The present disclosure aims to provide a pressure sensor ceramic material and a preparation method thereof.

The present disclosure provides the following technical solution: the pressure sensor ceramic material, by weight component, comprising:

45 parts to 50 parts of nano ceramic particles with a molecular formula $CaCu_{3-x}M_xTi_{4-y}Sc_yO_{12}$, wherein: $0<x\leq1$, $0.2\leq y\leq0.8$, and an element M is Ni, Zr, Co, Sr;

20 parts to 25 parts of glass-phase nano-oxide particles with a molecular formula $A_2O_3$, wherein: an element A is Er, Fe, Cr or Bi;

AlN: 15 parts to 20 parts;
BeO: 8 parts to 12 parts;
poly (methyl methacrylate) (PMMA): 20 parts to 30 parts;
polycrystalline diamond powder: 10 parts to 15 parts;
microfiltration membrane polymer: 55 parts to 65 parts; and
dimethylformamide 20 parts to 25 parts.

Further, a preparation method of $CaCu_{3-x}M_xTi_{4-y}Sc_yO_{12}$ nano ceramic particles comprises following steps:

S1: dissolving calcium inorganic saline compound, copper inorganic saline compound and M element inorganic saline compound in ethanol at a molar ratio of 1:3-x: x to form first mixed precursor solution;

S2: dissolving titanate coupling agent and scandium inorganic saline compound in acetylacetone at a molar ratio of 4-y:y to form second mixed precursor solution;

S3: stirring the first mixed precursor solution obtained in the S1 and the second mixed precursor solution obtained in the S2 at a temperature of 95° C. to 105° C. and at a revolution speed of 200 rpm to 300 rpm for 15 minutes, and adding ethanol solution dropwise during the stirring to form $CaCu_{3-x}M_xTi_{4-y}Sc_yO_{12}$ nanometer precursor gel;

S4: drying the $CaCu_{3-x}M_xTi_{4-y}Sc_yO_{12}$ nanometer precursor obtained in the S3 in a nitrogen gas atmosphere at a temperature of 150° C. to 160° C. for 2 hours to 2.5 hours, and grounding by a planetary ball mill to obtain $CaCu_{3-x}M_xTi_{4-y}Sc_yO_{12}$ nanometer precursor powder; and S5: calcining the $CaCu_{3-x}M_xTi_{4-y}Sc_yO_{12}$ nanometer precursor powder at a temperature of 950° C. to 1150° C. for 1 hour to 1.5 hours, and preventing $CaCu_{3-x}M_xTi_{4-y}Sc_yO_{12}$ crystals from growing to obtain the $CaCu_{3-x}M_xTi_{4-y}Sc_yO_{12}$ nano ceramic particles.

Further, the titanate coupling agent is one or more of tetraisopropyl di-titanate, isopropyl titanate, diisopropyl titanate or tetrabutyl orthotitanate.

Further, the copper inorganic saline compound is $Cu(NO_3)2.3H_2O$, $Cu(CH_3COO)_2.H_2O$, $CuCl_2.2H_2O$ or $CuSO_4.5H_2O$; the calcium inorganic saline compound is $Ca(NO_3)2.4H_2O$, $Ca(CH_3COO)2.H_2O$, $CaSO_4.2H_2O$ or $CaCl_2.6H_2O$.

Further, hydrates of the M element inorganic saline compound are $Ni(NO_3)_2.6H_2O$, $Ni(CH_3COO)_2.4H_2O$, $NiSO_4.6H_2O$, $NiCl_2.6H_2O$, $Zr(NO_3)_3.5H_2O$, $Zr(SO_4)_2.4H_2O$, $ZrOCl_2.8H_2O$, $Co(NO_3)_2.6H_2O$, $Co(CH_3COO)_2.4H_2O$, $Co(SO_4)_2.7H_2O$, $CoCl_2.6H_2O$, $Sr(CH_3COO)_2.2H_2O$ or $SrCl_2.6H_2O$; and the scandium inorganic saline compound is $ScCl_3.6H_2O$, $Sc_2(SO_4)_3.8H_2O$, $Sc(CH_3COO)_3.5H_2O$, or $Sc(NO_3)_3.H_2O$.

Further, a volume fraction of the ethanol in the ethanol solution added dropwise in the step S3 is 20% to 40%.

Further, the polycrystalline diamond powder has a particle size of 15 μm to 25 μm.

Further, a preparation method of the pressure sensor ceramic material, comprising the following steps:

M1: dissolving the polycrystalline diamond powder in concentrated NaOH solution with a concentration of 10M to 12M, after boiling at a temperature of 100° C. to 110° C., washing with distilled water three times, then immersing in HCl with a concentration of 2M to 5M, shaking under ultrasonic wave for 20 minutes to 30 minutes to obtain pretreated polycrystalline diamond powder;

M2: mixing AlN of the weight component and BeO of the weight component with PMMA of the weight component, and stirring at a temperature of 60° C. to 70° C. and at a revolution speed of 180 rpm to 230 rpm for 10 minutes to 15 minutes;

M3: placing mixture obtained in the M2 and the pretreated polycrystalline diamond powder obtained in the M1 in a vacuum, vacuuming in an inert atmosphere at 10 MPa to 15 MPa, and heating at a heating rate of 20° C./min to a temperature of 350° C. to 400° C. and holding for 1.5 hours, continuing heating at the heating rate of 20° C./min to a temperature of 950° C. to 1000° C. and holding for 2 hours to 2.5 hours to obtain diamond powder coated with a sub-micron layer doped the AlN and the BeO, and the sub-micron layer is 10 μm to 20 μm;

M4: mixing nano ceramic particles with the molecular formula $CaCu_{3-x}M_xTi_{4-y}Sc_yO_{12}$ of the weight component, $A_2O_3$ glass-phase nano-oxide particles of the weight component, and one-third of dimethylformamide of the weight component, stirring at a temperature of 50° C. to 70° C. and at a revolution speed of 150 rpm to 200 rpm for 30 minutes to 45 minutes, standing obtained mixture at a room temperature for 10 minutes, then centrifuging at a revolution speed of 3000 rpm to 4000 rpm for 5 minutes to 10 minutes, washing the obtained precipitate in the ethanol for 3 times, and then washing in the distilled water for 3 times to obtain $A_2O_3$ glass-phase nano-oxide particles modified $CaCu_{3-x}M_xTi_{4-y}Sc_yO_{12}$ gradient nanoparticles; and M5: mixing the $A_2O_3$ glass-phase nano-oxide particles modified $CaCu_{3-x}M_xTi_{4-y}Sc_yO_{12}$ gradient nanoparticle obtained in the M4 and remaining two-thirds of dimethylformamide of the weight component uniformly, and then mixing with microfiltration membrane polymer of the weight component and diamond powder coated with a sub-micron layer doped the AlN and the BeO obtained in the M3, stirring at a temperature of 55° C. to 75° C. and at a revolution speed of 250 rpm to 300 rpm for 30 minutes to 45 minutes, then drying under nitrogen gas flow at a temperature of 70° C. to 80° C. to obtain the pressure sensor ceramic material.

Further, the inert atmosphere used for vacuuming in the M3 is an argon atmosphere, and a flow rate is 160 ml/min to 200 ml/min The beneficial effects of the present disclosure are:

1. The diamond powder coated with 10 μm to 20 μm of the sub-micron layer doped the AlN and the BeO can be prepared by using polycrystalline diamond powder and AlN, BeO after PMMA treatment, in a vacuum inert atmosphere at high temperature. Polycrystalline diamond has good mechanical strength, and the bonding strength of the final ceramic composite can be enhanced by adding AlN and BeO. In the coating process, the BeO can make the $Be^{2+}$ ion as the acceptor diffused to form a grain boundary barrier and improve the height of the grain boundary barrier, so as to affect the electrical property and reduce the defect of uniform and isotropic crystal structure caused by gradient modification of $CaCu_{3-x}M_xTi_{4-y}Sc_yO12$ by $A_2O_3$ glass-phase nano-oxide, reduces the stress concentration of the resulting pressure sensor ceramic material against impact, further enhances the mechanical properties of the pressure sensor ceramic material, and avoids the defect that the cross-section bonding degree decreases due to the grain boundary movement. Meanwhile, AlN can be stabilized up to 2200° C., and the strength at the room temperature is high and decreases slowly with the increase of the room temperature. The pressure sensor ceramic material has good thermal conductivity, small thermal expansion coefficient, and is a good heat-resistant impact material. And the pressure sensor ceramic material has strong resistance to molten metal erosion, and it is a good electrical insulator with excellent dielectric properties. By means of AlN and BeO coated polycrystalline diamond, the insulation property of the pressure sensor ceramic material is further enhanced and the thermal expansion coefficient is reduced, so that the final pressure sensor ceramic material has good insulation property and heat dissipation property.

2. In the present disclosure, nano ceramic particles with a molecular formula $CaCu_{3-x}M_xTi_{4-y}Sc_yO_{12}$ are prepared by self-manufacturing, and Cu is substituted with Ni, Zr, Co, Sr, and mixed with calcium inorganic saline compound, mixture of copper inorganic saline compound and M metal inorganic saline compound, and M element mixed precursor solution in the preparation process, so as to obtain a compact microstructure and reduce the porosity of the nanoparticle, furthermore, to change the spatial structure of the $CaCu_3Ti_4O_{12}$, and improve the dielectric constant and dielectric loss of the final $CaCu_{3-x}M_xTi_{4-y}Sc_yO_{12}$ nano ceramic particles by increasing the anisotropic field. At the same time, the doping and substitution of Ti by Sc element reduces the vacancy of Ti in space, thus making the prepared $CaCu_{3-x}M_xTi_{4-y}Sc_yO_{12}$ geometric space structure more orderly, and ensuring the potential gradient of $CaCu_{3-x}M_xTi_{4-y}Sc_yO_{12}$ and reducing dielectric loss and leakage current of $CaCu_{3-x}M_xTi_{4-y}Sc_yO_{12}$.

3. Adding glass-phase nano-oxide particles with the molecular formula A2O3 and encapsulating the nano ceramic particles with the formula $CaCu_{3-x}M_xTi_{4-y}Sc_yO_{12}$, to improve the melting enthalpy of the $CaCu_{3-x}M_xTi_{4-y}Sc_yO_{12}$ nano ceramic particles, and the modification is gradient modification, with nano ceramic particles close to the inner core $CaCu_{3-x}M_xTi_{4-y}Sc_yO_{12}$, the content of the outer shell $A_2O_3$ glass phase nanoparticles is low; with the nano ceramic particles away from the inner core $CaCu_{3-x}M_xTi_{4-y}Sc_yO_{12}$, the shell $A_2O_3$ glass phase nanoparticles gradually increases. Furthermore, the dielectric constant of the capacitor varistor sensor is not reduced while the insulation property is improved, so that the pressure sensor ceramic material obtained has high dielectric constant, low dielectric loss and high insulation property.

DETAILED DESCRIPTION OF THE EMBODIMENTS

The technical solution in the embodiment of the present disclosure will be clearly and completely described in connection with the embodiment of the present disclosure. It is obvious that the described embodiment is only part of the embodiment of the present disclosure and not all of the embodiments. Based on the embodiments of the present disclosure, all other embodiments obtained by those skilled in the art without creative labor belong to the scope of protection of the present disclosure.

Embodiment 1

A pressure sensor ceramic material is provided in the embodiment, by weight component, comprising:

nano ceramic particles with a molecular formula $CaCu_2(Ni_{0.6}Co_{0.4})Ti_{3.8}Sc_{0.2}O_{12}$: 45 parts;

glass-phase nano-oxide particles with a molecular formula $Er_2O_3$: 20 parts;

AlN: 15 parts;

BeO: 8 parts;

PMMA: 20 parts;

polycrystalline diamond powder with a particle size of 15 μm: 10 parts;

polyvinylidene fluoride: 55 parts; and dimethylformamide 20 parts.

Wherein: a preparation method of $CaCu_2(Ni_{0.6}Co_{0.4})Ti_{3.8}Sc_{0.2}O_{12}$ nano ceramic particles comprises following steps:

S1: dissolving $Ca(CH_3COO)_2.H_2$, $Cu(CH_3COO)_2.H_2O$, $Ni(CH_3COO)_2.4H_2O$ and $Co(CH_3COO)_2.4H_2O$ in ethanol at a molar ratio of 1:2:0.6:0.4 to form first mixed precursor solution;

S2: dissolving tetrabutyl orthotitanate and $Sc(CH_3COO)_3.5H_2O$ in acetylacetone at a molar ratio of 3.8:0.2 to form second mixed precursor solution;

S3: stirring the first mixed precursor solution obtained in the S1 and the second mixed precursor solution obtained in the S2 at a temperature of 95° C. and at a revolution speed of 200 rpm for 15 minutes, and adding ethanol solution with a volume fraction of 20% dropwise during the stirring to form $CaCu_2(Ni_{0.6}Co_{0.4})Ti_{3.8}Sc_{0.2}O_{12}$ nanometer precursor gel;

S4: drying the $CaCu_2(Ni_{0.6}Co_{0.4})Ti_{3.8}Sc_{0.2}O_{12}$ nanometer precursor obtained in the S3 in a nitrogen gas atmosphere at a temperature of 150° C. for 2 hours, and grounding by a planetary ball mill to obtain $CaCu_2(Ni_{0.6}Co_{0.4})Ti_{3.8}Sc_{0.2}O_{12}$ nanometer precursor powder; and S5: calcining the $CaCu_2(Ni_{0.6}Co_{0.4})Ti_{3.8}Sc_{0.2}O_{12}$ nanometer precursor powder at a temperature of 950° C. for an hour, and preventing $CaCu_2(Ni_{0.6}Co_{0.4})Ti_{3.8}Sc_{0.2}O_{12}$ crystals from growing to obtain the $CaCu_2(Ni_{0.6}Co_{0.4})Ti_{3.8}Sc_{0.2}O_{12}$ nano ceramic particles.

A preparation method of the pressure sensor ceramic material is provided in the embodiment, comprising the following steps:

M1: dissolving 10 parts of the polycrystalline diamond powder with a particle size of 15 μm in concentrated NaOH solution with a concentration of 10M, after boiling at a temperature of 100° C., washing with distilled water three times, then immersing in HCl with a concentration of 2M, shaking under ultrasonic wave for 20 minutes to obtain pretreated polycrystalline diamond powder;

M2: mixing 15 parts of the AlN and 8 parts of the BeO with 20 parts of the PMMA, and stirring at a temperature of 61° C. and at a revolution speed of 180 rpm for 10 minutes;

M3: placing mixture obtained in the M2 and the pretreated polycrystalline diamond powder obtained in the M1 in a vacuum, vacuuming in an argon atmosphere with a flow rate of 160 ml/min at 10 MPa, and heating at a heating rate of 20° C./min to a temperature of 350° C. and holding for 1.5 hours, continuing heating at the heating rate of 20° C./min to a temperature of 950° C. and holding for 2 hours to obtain diamond powder coated with a sub-micron layer doped the AlN and the BeO, and the sub-micron layer is 10 μm;

M4: mixing the 45 parts of nano ceramic particles with the molecular formula $CaCu_2(Ni_{0.6}Co_{0.4})Ti_{3.8}Sc_{0.2}O_{12}$, the $Er_2O_3$ glass-phase nano-oxide particles of the weight component, and 6.67 parts of the dimethylformamide, stirring at a temperature of 50° C. and at a revolution speed of 150 rpm for 30 minutes, standing obtained mixture at a room temperature for 10 minutes, then centrifuging at a revolution speed of 3000 rpm for 5 minutes, washing the obtained precipitate in the ethanol for 3 times, and then washing in the distilled water for 3 times to obtain $Er_2O_3$ glass-phase nano-oxide particles modified $CaCu_2(Ni_{0.6}Co_{0.4})Ti_{3.8}Sc_{0.2}O_{12}$ gradient nanoparticles; and M5: mixing the $Er_2O_3$ glass-phase nano-oxide particles modified $CaCu_2(Ni_{0.6}Co_{0.4})Ti_{3.8}Sc_{0.2}O_{12}$ gradient nanoparticle obtained in the M4 and remaining 13.33 parts of the dimethylformamide uniformly, and then mixing with the 55 parts of the polyvinylidene fluoride and the diamond powder coated with the sub-micron layer doped the AlN and the BeO obtained in the M3, stirring at a temperature of 55° C. and at a revolution speed of 250 rpm for 30 minutes, then drying under nitrogen gas flow at a temperature of 70° C. to obtain the pressure sensor ceramic material.

Embodiment 2

A pressure sensor ceramic material is provided in the embodiment, by weight component, comprising:

nano ceramic particles with a molecular formula $CaCu_{2.5}Zr_{0.5}Ti_{3.5}Sc_{0.5}O_{12}$: 50 parts;
glass-phase nano-oxide particles with a molecular formula $Bi_2O_3$: 25 parts;
AlN: 20 parts;
BeO: 12 parts;
PMMA: 30 parts;
polycrystalline diamond powder with a particle size of 20 μm: 15 parts;
polysulfonated phenyl ether sulfone: 65 parts; and
dimethylformamide 25 parts.

Wherein: a preparation method of $CaCu_{2.5}Zr_{0.5}Ti_{3.5}Sc_{0.5}O_{12}$ nano ceramic particles comprises following steps:

S1: dissolving $CaSO_4 \cdot 2H_2O$, $CuSO_4 \cdot 5H_2O$, and $Zr(SO_4)_2 \cdot 4H_2O$ in ethanol at a molar ratio of 1:2.5:0.5 to form first mixed precursor solution;

S2: dissolving tetraisopropyl di-titanate and $Sc_2(SO_4)_3 \cdot 8H_2O$ in acetylacetone at a molar ratio of 7:1 to form second mixed precursor solution;

S3: stirring the first mixed precursor solution obtained in the S1 and the second mixed precursor solution obtained in the S2 at a temperature of 105° C. and at a revolution speed of 300 rpm for 15 minutes, and adding ethanol solution with a volume fraction of 40% dropwise during the stirring to form $CaCu_{2.5}Zr_{0.5}Ti_{3.5}Sc_{0.5}O_{12}$ nanometer precursor gel;

S4: drying the $CaCu_{2.5}Zr_{0.5}Ti_{3.5}Sc_{0.5}O_{12}$ nanometer precursor obtained in the S3 in a nitrogen gas atmosphere at a temperature of 160° C. for 2.5 hours, and grounding by a planetary ball mill to obtain $CaCu_{2.5}Zr_{0.5}Ti_{3.5}Sc_{0.5}O_{12}$ nanometer precursor powder; and S5: calcining the $CaCu_{2.5}Zr_{0.5}Ti_{3.5}Sc_{0.5}O_{12}$ nanometer precursor powder at a temperature of 1150° C. for 1.5 hours, and preventing $CaCu_{2.5}Zr_{0.5}Ti_{3.5}Sc_{0.5}O_{12}$ crystals from growing to obtain the $CaCu_{2.5}Zr_{0.5}Ti_{3.5}Sc_{0.5}O_{12}$ nano ceramic particles.

A preparation method of the pressure sensor ceramic material is provided in the embodiment, comprising the following steps:

M1: dissolving 15 parts of the polycrystalline diamond powder with a particle size of 20 μm in concentrated NaOH solution with a concentration of 12M, after boiling at a temperature of 110° C., washing with distilled water three times, then immersing in HCl with a concentration of 5M, shaking under ultrasonic wave for 30 minutes to obtain pretreated polycrystalline diamond powder;

M2: mixing 20 parts of the AlN and 12 parts of the BeO with 30 parts of the PMMA, and stirring at a temperature of 70° C. and at a revolution speed of 230 rpm for 15 minutes;

M3: placing mixture obtained in the M2 and the pretreated polycrystalline diamond powder obtained in the M1 in a vacuum, vacuuming in an argon atmosphere with a flow rate of 180 ml/min at 15 MPa, and heating at a heating rate of 20° C./min to a temperature of 400° C. and holding for 1.5 hours, continuing heating at the heating rate of 20° C./min to a temperature of 1000° C. and holding for 2.5 hours to obtain diamond powder coated with a sub-micron layer doped the AlN and the BeO, and the sub-micron layer is 15 μm;

M4: mixing the 50 parts of nano ceramic particles with the molecular formula $CaCu_{2.5}Zr_{0.5}Ti_{3.5}Sc_{0.5}O_{12}$, 25 parts of the $Bi_2O_3$ glass-phase nano-oxide particles, and 11.67 parts of the dimethylformamide, stirring at a temperature of 70° C. and at a revolution speed of 200 rpm for 45 minutes, standing obtained mixture at a room temperature for 10 minutes, then centrifuging at a revolution speed of 4000 rpm for 10 minutes, washing the obtained precipitate in the ethanol for 3 times, and then washing in the distilled water for 3 times to obtain $Bi_2O_3$ glass-phase nano-oxide particles modified $CaCu_{2.5}Zr_{0.5}Ti_{3.5}Sc_{0.5}O_{12}$ gradient nanoparticles; and M5: mixing the $Bi_2O_3$ glass-phase nano-oxide particles modified $CaCu_{2.5}Zr_{0.5}Ti_{3.5}Sc_{0.5}O_{12}$ gradient nanoparticle obtained in the M4 and remaining 13.33 parts of the dimethylformamide uniformly, and then mixing with the 65 parts of the polysulfonated phenyl ether sulfone and the diamond powder coated with the sub-micron layer doped the AlN and the BeO obtained in the M3, stirring at a temperature of 75° C. and at a revolution speed of 300 rpm for 45 minutes, then drying under nitrogen gas flow at a temperature of 80° C. to obtain the pressure sensor ceramic material.

Embodiment 3

A pressure sensor ceramic material is provided in the embodiment, by weight component, comprising:
nano ceramic particles with a molecular formula $CaCu_{2.9}Sr_{0.1}Ti_{3.2}Sc_{0.8}O_{12}$: 47.5 parts;
glass-phase nano-oxide particles with a molecular formula $Cr_2O_3$: 22.5 parts;
AlN: 17.5 parts;
BeO: 10 parts;
PMMA 25 parts;
polycrystalline diamond powder with a particle size of 25 μm: 12.5 parts;
polyphenylene sulfide: 25 parts;
polytetrafluoroethylene: 25 parts; and
dimethylformamide 22.5 parts.
Wherein: a preparation method of $CaCu_{2.9}Sr_{0.1}Ti_{3.2}Sc_{0.8}O_{12}$ nano ceramic particles comprises following steps:
S1: dissolving $CaCl_2 \cdot 6H_2O$, $CuCl_2 \cdot 2H_2O$, and $SrCl_2 \cdot 6H_2O$ in ethanol at a molar ratio of 1:2.9:0.1 to form first mixed precursor solution;
S2: dissolving diisopropyl titanate and $ScCl_3 \cdot 6H_2O$ in acetylacetone at a molar ratio of 4:1 to form second mixed precursor solution;
S3: stirring the first mixed precursor solution obtained in the S1 and the second mixed precursor solution obtained in the S2 at a temperature of 100° C. and at a revolution speed of 250 rpm for 15 minutes, and adding ethanol solution dropwise during the stirring to form $CaCu_{2.9}Sr_{0.1}Ti_{3.2}Sc_{0.8}O_{12}$ nanometer precursor gel;
S4: drying the $CaCu_{2.9}Sr_{0.1}Ti_{3.2}Sc_{0.8}O_{12}$ nanometer precursor obtained in the S3 in a nitrogen gas atmosphere at a temperature of 155° C. for 2.25 hours, and grounding by a planetary ball mill to obtain $CaCu_{2.9}Sr_{0.1}Ti_{3.2}Sc_{0.8}O_{12}$ nanometer precursor powder; and
S5: calcining the $CaCu_{2.9}Sr_{0.1}Ti_{3.2}Sc_{0.8}O_{12}$ nanometer precursor powder at a temperature of 1000° C. for 1.25 hours, and preventing $CaCu_{2.9}Sr_{0.1}Ti_{3.2}Sc_{0.8}O_{12}$ crystals from growing to obtain the $CaCu_{2.9}Sr_{0.1}Ti_{3.2}Sc_{0.8}O_{12}$ nano ceramic particles.

A preparation method of the pressure sensor ceramic material is provided in the embodiment, comprising the following steps:
M1: dissolving 12.5 parts of the polycrystalline diamond powder with a particle size of 25 μm in concentrated NaOH solution with a concentration of 11M, after boiling at a temperature of 105° C., washing with distilled water three times, then immersing in HCl with a concentration of 3.5M, shaking under ultrasonic wave for 25 minutes to obtain pretreated polycrystalline diamond powder;
M2: mixing 17.5 parts of the AlN and 10 parts of the BeO with PMMA, of the weight component and stirring at a temperature of 65° C. and at a revolution speed of 205 rpm for 12 minutes;
M3: placing mixture obtained in the M2 and the pretreated polycrystalline diamond powder obtained in the M1 in a vacuum, vacuuming in an argon atmosphere with a flow rate of 200 ml/min at 12.5 MPa, and heating at a heating rate of 20° C./min to a temperature of 375° C. and holding for 1.5 hours, continuing heating at the heating rate of 20° C./min to a temperature of 980° C. and holding for 2.25 hours to obtain diamond powder coated with a sub-micron layer doped the AlN and the BeO, and the sub-micron layer is 20 μm;
M4: mixing the 47.5 parts of nano ceramic particles with the molecular formula $CaCu_{2.9}Sr_{0.1}Ti_{3.2}Sc_{0.8}O_{12}$, 22.5 parts of the $Cr_2O_3$ glass-phase nano-oxide particles, and 7.5 parts of the dimethylformamide, stirring at a temperature of 65° C. and at a revolution speed of 175 rpm for 38 minutes, standing obtained mixture at a room temperature for 10 minutes, then centrifuging at a revolution speed of 4000 rpm for 10 minutes, washing the obtained precipitate in the ethanol for 3 times, and then washing in the distilled water for times to obtain $Cr_2O_3$ glass-phase nano-oxide particles modified $CaCu_{2.9}Sr_{0.1}Ti_{3.2}Sc_{0.8}O_{12}$ gradient nanoparticles; and
M5: mixing the $Cr_2O_3$ glass-phase nano-oxide particles modified $CaCu_{2.9}Sr_{0.1}Ti_{3.2}Sc_{0.8}O_{12}$ gradient nanoparticle obtained in the M4 and remaining 15 parts of the dimethylformamide uniformly, and then mixing with the 25 parts of the polyphenylene sulfide, 25 parts of the polytetrafluoroethylene and the diamond powder coated with the sub-micron layer doped the AlN and the BeO obtained in the M3, stirring at a temperature of 65° C. and at a revolution speed of 275 rpm for 37 minutes, then drying under nitrogen gas flow at a temperature of 75° C. to obtain the pressure sensor ceramic material.

Comparative Embodiment 1

The present comparative embodiment differs from Embodiment 1 in: AlN and BeO are not used and by weight component, comprising:
nano ceramic particles with a molecular formula $CaCu_2(Ni_{0.6}Co_{0.4})Ti_{3.8}Sc_{0.2}O_{12}$: 45 parts;
glass-phase nano-oxide particles with a molecular formula $Er_2O_3$: 20 parts;
PMMA: 20 parts;
polycrystalline diamond powder with a particle size of 15 μm: 10 parts;
polyvinylidene fluoride: 55 parts; and
dimethylformamide 20 parts.
Further, the final production steps comprises the following steps:
M1: dissolving 10 parts of the polycrystalline diamond powder with a particle size of 15 μm in concentrated NaOH solution with a concentration of 10M, after boiling at a temperature of 100° C., washing with distilled water three times, then immersing in HCl with a concentration of 2M, shaking under ultrasonic wave for 20 minutes to obtain pretreated polycrystalline diamond powder;
M2: mixing the mixture obtained in the M1 with 20 parts of the PMMA, and stirring at a temperature of 61° C. and at a revolution speed of 180 rpm for 10 minutes;
M3: placing mixture obtained in the M2 and the pretreated polycrystalline diamond powder obtained in the M1 in a vacuum, vacuuming in an argon atmosphere with a flow rate of 160 ml/min at 10 MPa, and heating at a heating rate of 20° C./min to a temperature of 350° C. and holding for 1.5 hours, continuing heating at the heating rate of 20° C./min to a temperature of 950° C. and holding for 2 hours to obtain diamond powder coated with a sub-micron layer doped the AlN and the BeO, and the sub-micron layer is 10 μm;
M4: mixing the 45 parts of nano ceramic particles with the molecular formula $CaCu_2(Ni_{0.6}Co_{0.4})Ti_{3.8}Sc_{0.2}O_{12}$, the $Er_2O_3$ glass-phase nano-oxide particles of the weight component, and 6.67 parts of the dimethylformamide, stirring at a temperature of 50° C. and at a revolution speed of 150 rpm for 30 minutes, standing obtained mixture at a room temperature for 10 minutes, then centrifuging at a revolution speed of 3000 rpm for 5 minutes, washing the obtained precipitate in the ethanol for 3 times, and then washing in the distilled water for 3 times to obtain $Er_2O_3$ glass-phase nano-oxide particles modified $CaCu_2(Ni_{0.6}Co_{0.4})Ti_{3.8}Sc_{0.2}O_{12}$ gradient nanoparticles; and M5: mixing the $Er_2O_3$ glass-phase nano-oxide particles modified $CaCu_2(Ni_{0.6}Co_{0.4})Ti_{3.8}Sc_{0.2}O_{12}$ gradient nanoparticle obtained in the M4 and remaining 13.33 parts of the dimethylformamide uniformly, and then mixing with the 55 parts of the polyvinylidene fluoride and the diamond powder coated with the sub-micron layer doped the AlN and the BeO obtained in the M3, stirring at a temperature of 55° C. and at a revolution speed of 250 rpm for 30 minutes, then drying under nitrogen gas flow at a temperature of 70° C. to obtain the pressure sensor ceramic material.

Wherein, the preparation method of nano ceramic particles with the formula CaCu2(Ni0.6Co0.4)Ti3.8Sc0.2O12 is carried out as described in Embodiment 1.

Comparative Embodiment 2

The present comparative embodiment differs from Embodiment 1 in that the composition of $Er_2O_3$ glass-phase nano-oxide particles is not used and by weight component, comprising:

nano ceramic particles with a molecular formula $CaCu_2(Ni_{0.6}Co_{0.4})Ti_{3.8}Sc_{0.2}O_{12}$: 45 parts;
AlN: 15 parts;
BeO: 8 parts;
PMMA: 20 parts;
polycrystalline diamond powder with a particle size of 15 μm: 10 parts;
polyvinylidene fluoride: 55 parts; and
dimethylformamide 20 parts.

Further, the final production steps comprises the following steps:

M1: dissolving 10 parts of the polycrystalline diamond powder with a particle size of 15 μm in concentrated NaOH solution with a concentration of 10M, after boiling at a temperature of 100° C., washing with distilled water three times, then immersing in HCl with a concentration of 2M, shaking under ultrasonic wave for 20 minutes to obtain pretreated polycrystalline diamond powder;

M2: mixing 15 parts of the AlN and 8 parts of the BeO with 20 parts of the PMMA, and stirring at a temperature of 61° C. and at a revolution speed of 180 rpm for 10 minutes;

M3: placing mixture obtained in the M2 and the pretreated polycrystalline diamond powder obtained in the M1 in a vacuum, vacuuming in an argon atmosphere with a flow rate of 160 ml/min at 10 MPa, and heating at a heating rate of 20° C./min to a temperature of 350° C. and holding for 1.5 hours, continuing heating at the heating rate of 20° C./min to a temperature of 950° C. and holding for 2 hours to obtain diamond powder coated with a sub-micron layer doped the AlN and the BeO, and the sub-micron layer is 10 μm;

M4: mixing the 45 parts of the $CaCu_2(Ni_{0.6}Co_{0.4})Ti_{3.8}Sc_{0.2}O_{12}$ nano ceramic particles with 20 parts of the dimethylformamide uniformly, and then mixing with the 55 parts of the polyvinylidene fluoride and the diamond powder coated with the sub-micron layer doped the AlN and the BeO obtained in the M3, stirring at a temperature of 55° C. and at a revolution speed of 250 rpm for 30 minutes, then drying under nitrogen gas flow at a temperature of 70° C. to obtain the pressure sensor ceramic material.

Wherein, the preparation method of nano ceramic particles with the formula CaCu2(Ni0.6Co0.4)Ti3.8Sc0.2O12 is carried out as described in Embodiment 1.

Comparative Embodiment 3 the present comparative embodiment differs from Embodiment 1 in that $CaCu_3Ti_4O_{12}$ nano ceramic particles are used instead of the self-made $CaCu_{2.5}Ni_{0.5}Ti_4O_{12}$ nano ceramic particles and by weight component, comprising:

$CaCu_3Ti_4O_{12}$ nano ceramic particles: 45 parts;
glass-phase nano-oxide particles with a molecular formula $Er_2O_3$: 20 parts;
AlN: 15 parts;
BeO: 8 parts;
PMMA: 20 parts;
polycrystalline diamond powder with a particle size of 15 μm: 10 parts;
polyvinylidene fluoride: 55 parts; and
dimethylformamide 20 parts.

M1: dissolving 10 parts of the polycrystalline diamond powder with a particle size of 15 μm in concentrated NaOH solution with a concentration of 10M, after boiling at a temperature of 100° C., washing with distilled water three times, then immersing in HCl with a concentration of 2M, shaking under ultrasonic wave for 20 minutes to obtain pretreated polycrystalline diamond powder;

M2: mixing 15 parts of the AlN and 8 parts of the BeO with 20 parts of the PMMA, and stirring at a temperature of 61° C. and at a revolution speed of 180 rpm for 10 minutes;

M3: placing mixture obtained in the M2 and the pretreated polycrystalline diamond powder obtained in the M1 in a vacuum, vacuuming in an argon atmosphere with a flow rate of 160 ml/min at 10 MPa, and heating at a heating rate of 20° C./min to a temperature of 350° C. and holding for 1.5 hours, continuing heating at the heating rate of 20° C./min to a temperature of 950° C. and holding for 2 hours to obtain diamond powder coated with a sub-micron layer doped the AlN and the BeO, and the sub-micron layer is 10 μm;

M4: mixing the 45 parts of nano ceramic particles with the molecular formula $CaCu_2(Ni_{0.6}Co_{0.4})Ti_{3.8}Sc_{0.2}O_{12}$, the $Er_2O_3$ glass-phase nano-oxide particles of the weight component, and 6.67 parts of the dimethylformamide, stirring at a temperature of 50° C. and at a revolution speed of 150 rpm for 30 minutes, standing obtained mixture at a room temperature for 10 minutes, then centrifuging at a revolution speed of 3000 rpm for 5 minutes, washing the obtained precipitate in the ethanol for 3 times, and then washing in the distilled water for 3 times to obtain $Er_2O_3$ glass-phase nano-oxide particles modified $CaCu_3Ti_4O_{12}$ gradient nanoparticles; and M5: mixing the $Er_2O_3$ glass-phase nano-oxide particles modified $CaCu_3Ti_4O_{12}$ gradient nanoparticle obtained in the M4 and remaining 13.33 parts of the dimethylformamide uniformly, and then mixing with the 55 parts of the polyvinylidene fluoride and the diamond powder coated with the sub-micron layer doped the AlN and the BeO obtained in the M3, stirring at a temperature of 55° C. and at a revolution speed of 250 rpm for 30 minutes, then drying under nitrogen gas flow at a temperature of 70° C. to obtain the pressure sensor ceramic material.

Test Embodiment

The mechanical strength, resistivity (representing insulation), porosity, dielectric constant, dielectric loss, leakage current, and coefficient of thermal expansion of the pressure sensor ceramic material of Embodiment 1 to Embodiment 3 and Comparative Embodiment 1 to Embodiment 3 are tested, and the results are shown in Table 1.

Although the present disclosure has been described with reference to the preferred embodiments, various modifications can be made to it without departing from the scope of the present disclosure and the components and parameters therein can be replaced with equivalents. Specifically, as long as there is no conflict of technical solutions, the various technical features mentioned in the various embodiments can be combined in any manner. The present disclosure is not limited to the specific embodiments disclosed herein, but comprises all technical solutions falling within the scope of the claims.

TABLE 1

|  | Embodiment 1 | Embodiment 2 | Embodiment 3 | Comparative Embodiment 1 | Comparative Embodiment 2 | Comparative Embodiment 3 |
|---|---|---|---|---|---|---|
| Mechanical strength | 36 Shao A | 38 Shao A | 45 Shao A | 24 Shao A | 21 Shao A | 19 Shao A |
| Resistivity ($\Omega \cdot m$) | $126 \times 10^{-7}$ | $137 \times 10^{-7}$ | $142 \times 10^{-7}$ | $306 \times 10^{-8}$ | $573 \times 10^{-7}$ | $231 \times 10^{-8}$ |
| Porosity | 32.15% | 34.11% | 37.02% | 10.10% | 9.64% | 6.98% |
| Dielectric Constant | 1406 | 1432 | 1542 | 336 | 167 | 252 |
| Dielectric Loss | 0.1397% | 0.1307% | 0.1125% | 0.3268% | 0.3744% | 0.5026% |
| Leakage Current | 153 μA | 147 μA | 142 μA | 265 μA | 278 μA | 302 μA |
| Coefficient of Thermal Expansion | $8.67 \times 10^{-6}/K$ | $8.35 \times 10^{-6}/K$ | $7.6 \times 10^{-6}/K$ | $21.87 \times 10^{-6}/K$ | $18.23 \times 10^{-6}/K$ | $16.45 \times 10^{-6}/K$ |

What is claimed is:

1. A pressure sensor ceramic material, by weight component, comprising:
   45 parts to 50 parts of nano ceramic particles with a molecular formula $CaCu_{3-x}M_xTi_{4-y}Sc_yO_{12}$, wherein $0<x\leq1$, $0.2\leq y\leq0.8$, and an element M is Ni, Zr, Co or Sr;
   20 parts to 25 parts of glass-phase nano-oxide particles with a molecular formula $A_2O_3$, wherein an element A is Er, Fe, Cr or Bi;
   AlN: 15 parts to 20 parts;
   BeO: 8 parts to 12 parts;
   poly(methyl methacrylate) (PMMA): 20 parts to 30 parts;
   polycrystalline diamond powder: 10 parts to 15 parts;
   microfiltration membrane polymer: 55 parts to 65 parts; and
   dimethylformamide: 20 parts to 25 parts,
   wherein the microfiltration membrane polymer is one of polyphenylene sulfide, polyvinylidene fluoride, polysulfonated phenyl ether sulfone and polytetrafluoroethylene; and
   a number of parts, corresponding to each of PMMA and the dimethylformamide, refers to a number of parts at which each of the PMMA and the dimethylformamide is added during preparation of the pressure sensor ceramic material,
   wherein a preparation method of the pressure sensor ceramic material comprises:
   M1: dissolving the polycrystalline diamond powder in concentrated NaOH solution with a concentration of 10 M to 12 M, after boiling at a temperature of 100° C. to 110° C., washing with distilled water three times, then immersing in HCl with a concentration of 2 M to 5 M, shaking under ultrasonic wave for 20 minutes to 30 minutes to obtain pretreated polycrystalline diamond powder;
   M2: mixing the AlN of the weight component and the BeO of the weight component with the PMMA of the weight component, and stirring at a temperature of 60° C. to 70° C. and at a revolution speed of 180 rpm to 230 rpm for 10 minutes to 15 minutes;
   M3: placing mixture obtained in M2 and the pretreated polycrystalline diamond powder obtained in M1 in a vacuum, vacuuming in an inert atmosphere at 10 MPa to 15 MPa, and heating at a heating rate of 20° C./min to a temperature of 350° C. to 400° C. and holding for 1.5 hours, continuing heating at the heating rate of 20° C./min to a temperature of 950° C. to 1000° C. and holding for 2 hours to 2.5 hours to obtain diamond powder coated with a sub-micron layer doped the AlN and the BeO, and the sub-micron layer is 10 μm to 20 μm;
   M4: mixing the nano ceramic particles with the molecular formula $CaCu_{3-x}M_xTi_{4-y}Sc_yO_{12}$ of the weight component, the $A_2O_3$ glass-phase nano-oxide particles of the weight component, and one-third of the dimethylformamide of the weight component, stirring at a temperature of 50° C. to 70° C. and at a revolution speed of 150 rpm to 200 rpm for 30 minutes to 45 minutes, standing obtained mixture at a room temperature for 10 minutes, then centrifuging at a revolution speed of 3000 rpm to 4000 rpm for 5 minutes to 10 minutes, washing the obtained precipitate in the ethanol for 3 times, and then washing in the distilled water for 3 times to obtain $A_2O_3$ glass-phase nano-oxide particles modified $CaCu_{3-x}M_xTi_{4-y}Sc_yO_{12}$ gradient nanoparticles; and
   M5: mixing the $A_2O_3$ glass-phase nano-oxide particles modified $CaCu_{3-x}M_xTi_{4-y}Sc_yO_{12}$ gradient nanoparticles obtained in M4 and remaining two-thirds of the dimethylformamide of the weight component uniformly, and then mixing with the microfiltration membrane polymer of the weight component and the diamond powder coated with the sub-micron layer doped the AlN and the BeO obtained in M3, stirring at a temperature of 55° C. to 75° C. and at a revolution speed of 250 rpm to 300 rpm for 30 minutes to 45 minutes, then drying under nitrogen gas flow at a temperature of 70° C. to 80° C. to obtain the pressure sensor ceramic material.

2. The pressure sensor ceramic material according to claim 1, wherein a preparation method of $CaCu_{3-x}M_xTi_{4-y}Sc_yO_{12}$ nano ceramic particles comprises following steps:
- S1: dissolving calcium inorganic saline compound, copper inorganic saline compound and M element inorganic saline compound in ethanol at a molar ratio of 1:3-x:x to form first mixed precursor solution;
- S2: dissolving silane coupling agent and scandium inorganic saline compound in acetylacetone at a molar ratio of 4-y:y to form second mixed precursor solution;
- S3: stirring the first mixed precursor solution obtained in the S1 and the second mixed precursor solution obtained in the S2 at a temperature of 95° C. to 105° C. and at a revolution speed of 200 rpm to 300 rpm for 15 minutes, and adding ethanol solution dropwise during the stirring to form $CaCu_{3-x}M_xTi_{4-y}Sc_yO_{12}$ nanometer precursor gel;
- S4: drying the $CaCu_{3-x}M_xTi_{4-y}Sc_yO_{12}$ nanometer precursor obtained in the S3 in a nitrogen gas atmosphere at a temperature of 150° C. to 160° C. for 2 hours to 2.5 hours, and grounding by a planetary ball mill to obtain $CaCu_{3-x}M_xTi_{4-y}Sc_yO_{12}$ nanometer precursor powder; and
- S5: calcining the $CaCu_{3-x}M_xTi_{4-y}Sc_yO_{12}$ nanometer precursor powder at a temperature of 950° C. to 1150° C. for 1 hour to 1.5 hours, and preventing $CaCu_{3-x}M_xTi_{4-y}Sc_yO_{12}$ crystals from growing to obtain the $CaCu_{3-x}M_xTi_{4-y}Sc_yO_{12}$ nano ceramic particles.

3. The pressure sensor ceramic material according to claim 2, wherein titanate coupling agent is one or more of tetraisopropyl di-titanate, isopropyl titanate, diisopropyl titanate or tetrabutyl orthotitanate.

4. The pressure sensor ceramic material according to claim 2, wherein the copper inorganic saline compound is $Cu(NO_3)_2.3H_2O$, $Cu(CH_3COO)_2.H_2O$, $CuCl_2.2H_2O$ or $CuSO_4.5H_2O$; the calcium inorganic saline compound is $Ca(NO_3)_2.4H_2O$, $Ca(CH_3COO)_2.H_2O$, $CaSO_4.2H_2O$ or $CaCl_2.6H_2O$.

5. The pressure sensor ceramic material according to claim 2, wherein hydrates of the M element inorganic saline compound are $Ni(NO_3)_2.6H_2O$, $Ni(CH_3COO)_2.4H_2O$, $NiSO_4.6H_2O$, $NiCl_2.6H_2O$, $Zr(NO_3)_3.5H_2O$, $Zr(SO_4)_2.4H_2O$, $ZrOCl_2.8H_2O$, $Co(NO_3)_2.6H_2O$, $Co(CH_3COO)_2.4H_2O$, $Co(SO_4)_2.7H_2O$, $CoCl_2.6H_2O$, $Sr(CH_3COO)_2.2H_2O$ or $SrCl_2.6H_2O$; and the scandium inorganic saline compound is $ScCl_3.6H_2O$, $Sc_2(SO_4)_3.8H_2O$, $Sc(CH_3COO)_3.5H_2O$, or $Sc(NO_3)_3.H_2O$.

6. The pressure sensor ceramic material according to claim 2, wherein a volume fraction of the ethanol in the ethanol solution added dropwise in the step S3 is 20% to 40%.

7. The pressure sensor ceramic material according to claim 1, wherein the polycrystalline diamond powder has a particle size of 15 μm to 25 μm.

8. The pressure sensor ceramic material according to claim 1, wherein the inert atmosphere used for vacuuming in the M3 is an argon atmosphere, and a flow rate is 160 ml/min to 200 ml/min.

* * * * *